(12) United States Patent
Grover et al.

(10) Patent No.: US 10,637,655 B1
(45) Date of Patent: Apr. 28, 2020

(54) SYSTEM, METHOD, AND COMPUTER PROGRAM FOR PROVIDING SEAMLESS DATA ACCESS FROM DIFFERENT INTERNET SERVICE PROVIDERS

(71) Applicant: Amdocs Development Limited, Limassol (CY)

(72) Inventors: Karan Grover, Punjab (IN); Mandeep Singh Sidhu, Punjab (IN); Navdeep Singh, Panipat (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 307 days.

(21) Appl. No.: 15/866,342

(22) Filed: Jan. 9, 2018

(51) Int. Cl.
*H04L 9/32* (2006.01)
*H04L 9/08* (2006.01)
(Continued)

(52) U.S. Cl.
CPC ........ *H04L 9/0827* (2013.01); *H04L 12/1435* (2013.01); *H04L 63/0435* (2013.01);
(Continued)

(58) Field of Classification Search
CPC ............... H04L 9/0827; H04L 12/1435; H04L 63/0435; H04L 63/0884; H04L 67/141; H04L 2209/80; H04W 12/06
See application file for complete search history.

(56) References Cited

U.S. PATENT DOCUMENTS 7,116,968 B2 * 10/2006 Koskinen .............. H04M 15/00
455/406
7,127,234 B2 * 10/2006 Ishii .................... H04L 12/2856
455/411
(Continued)

FOREIGN PATENT DOCUMENTS

WO          2006116908 A1    11/2006

*Primary Examiner* — Baotran N To
(74) *Attorney, Agent, or Firm* — Zilka-Kotab, P.C.

(57) ABSTRACT

A system, method, and computer program product are provided for providing seamless data access from different internet service providers. In operation, a master modem receives a ping from a device for requesting an encrypted key associated with an internet session corresponding to one of a plurality of Internet Service Providers (ISPs). The master modem authenticates the device and responds with the encrypted key. The master modem notifies an Internet Service Provider (ISP) system associated with the internet session with the encrypted key before beginning the internet session with the device. The ISP system verifies parameters to determine whether to allow the session to begin, in response to the notifying. The master modem receives authorization to begin the internet session from the ISP system. The master modem sets a port and speed associated with the master modem to aid in maintaining Quality of Service (QoS) for the internet session. The master modem triggers the device for beginning the internet session. The device utilizes data during the internet session, which is associated with the encrypted key. The master modem deducts the data used during the internet session from a shared data pool associated with the plurality of Internet Service Providers. The encrypted key is utilized to correlate the data used during the internet session with the deduction from the shared data pool.

20 Claims, 11 Drawing Sheets

(51) Int. Cl.
  *H04L 29/08*   (2006.01)
  *H04L 12/14*   (2006.01)
  *H04L 29/06*   (2006.01)
  *H04W 12/06*   (2009.01)

(52) U.S. Cl.
  CPC ........ *H04L 63/0884* (2013.01); *H04L 67/141* (2013.01); *H04W 12/06* (2013.01); *H04L 2209/80* (2013.01)

(56) References Cited

U.S. PATENT DOCUMENTS

| | | | |
|---|---|---|---|
| 8,589,541 B2* | 11/2013 | Raleigh | H04L 47/12 709/224 |
| 9,172,605 B2* | 10/2015 | Hardy | H04L 63/0876 |
| 2002/0034298 A1* | 3/2002 | Gallagher | H04L 63/08 380/247 |
| 2004/0153404 A1 | 8/2004 | Rischmueller et al. | |
| 2005/0254652 A1* | 11/2005 | Engler | H04L 63/062 380/270 |
| 2009/0323969 A1* | 12/2009 | Nishi | H04J 13/00 380/281 |
| 2011/0010461 A1 | 1/2011 | Lassila et al. | |
| 2013/0129091 A1* | 5/2013 | Kang | H04W 12/04 380/270 |
| 2014/0071970 A1 | 3/2014 | Velasco | |

\* cited by examiner

SYSTEM, METHOD, AND COMPUTER PROGRAM FOR PROVIDING SEAMLESS DATA ACCESS FROM DIFFERENT INTERNET SERVICE PROVIDERS

FIELD OF THE INVENTION

The present invention relates to internet distribution across end devices and data sharing across different platforms and, more particularly to, a telecom architecture that enables seamless flow of data among various devices irrespective of carriers, service providers (SPs), geographies, end-devices, and cellular technology generations, etc.

BACKGROUND

Currently, consumption of data among subscribers is increasing day by day, and data packets are even used for making voice based calls. In most cases, customers or end-users rely heavily on service providers for internet facilities.

The need of content access and usage cannot be controlled as it is quite infeasible and difficult. However, flexibility of data packets can be implemented in such a way that the end-users can use data anytime and anywhere. Such an approach can provide content access regardless of service providers and their billing schemes.

There is thus a need for addressing these and/or other issues associated with the prior art.

SUMMARY

A system, method, and computer program product are provided for providing seamless data access from different internet service providers. In operation, a master modem receives a ping from a device for requesting an encrypted key associated with an internet session corresponding to one of a plurality of Internet Service Providers (ISPs). The master modem authenticates the device and responds with the encrypted key. The master modem notifies an Internet Service Provider (ISP) system associated with the internet session with the encrypted key before beginning the internet session with the device. The ISP system verifies parameters to determine whether to allow the session to begin, in response to the notifying. The master modem receives authorization to begin the internet session from the ISP system. The master modem sets a port and speed associated with the master modem to aid in maintaining Quality of Service (QoS) for the internet session. The master modem triggers the device for beginning the internet session. The device utilizes data during the internet session, which is associated with the encrypted key. The master modem deducts the data used during the internet session from a shared data pool associated with the plurality of Internet Service Providers. The encrypted key is utilized to correlate the data used during the internet session with the deduction from the shared data pool.

DETAILED DESCRIPTION

Figure 1:
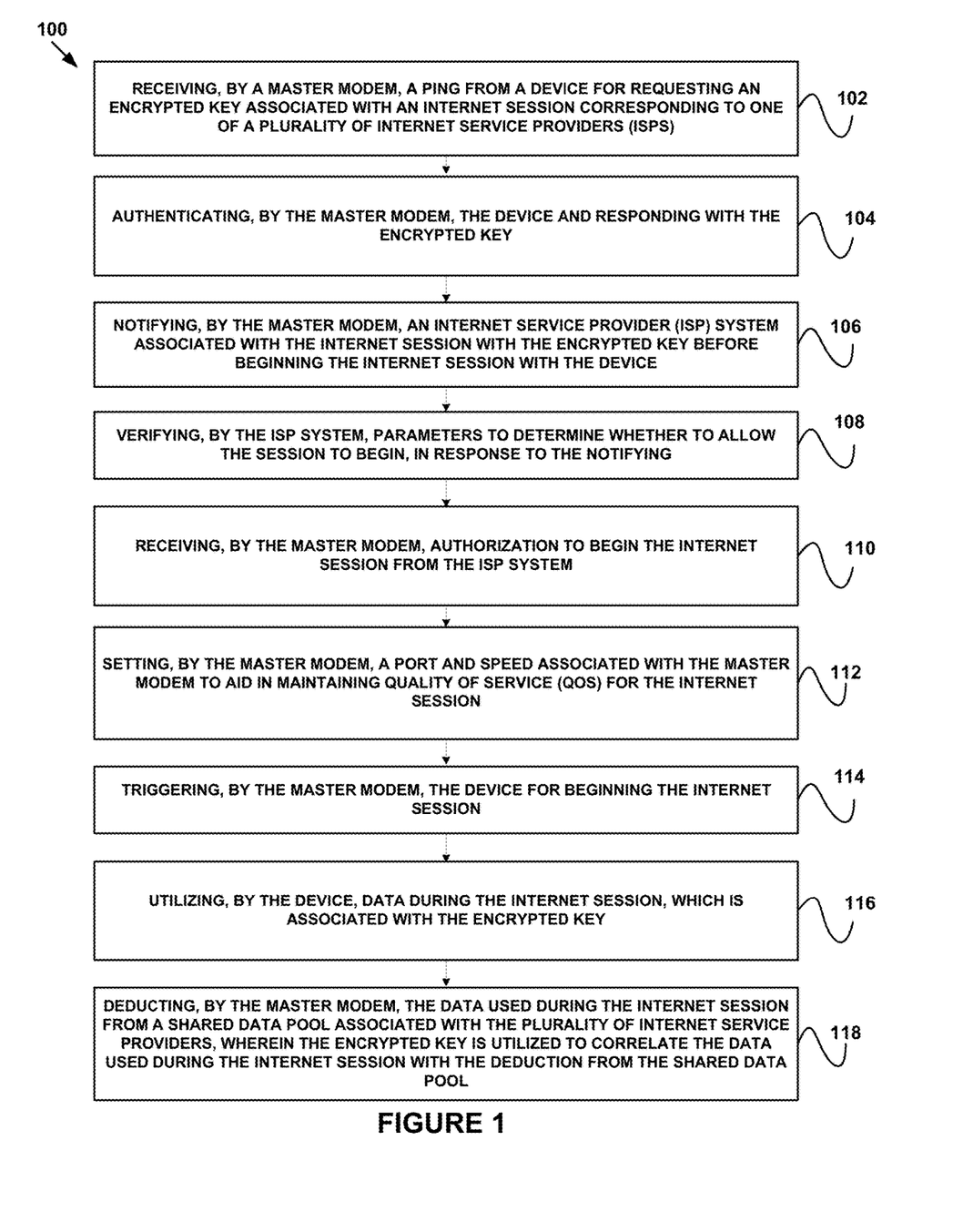
FIG. 1 illustrates a method for providing seamless data access from different internet service providers, in accordance with one embodiment.

FIG. 1 illustrates a method 100 for providing seamless data access from different internet service providers, in accordance with one embodiment.

In operation, a master modem receives a ping from a device for requesting an encrypted key associated with an internet session corresponding to one of a plurality of Internet Service Providers (ISPs). See operation 102. The device may include any device capable of communication, such as a mobile phone, a tablet computer, a desktop computer, and/or various other devices.

The master modem authenticates the device and responds with the encrypted key. See operation 104. The master modem notifies an Internet Service Provider (ISP) system associated with the internet session with the encrypted key before beginning the internet session with the device. See operation 106.

The ISP system verifies parameters to determine whether to allow the session to begin, in response to the notifying from the master modem. See operation 108. The parameters may include various parameters, such as bandwidth, data available in a shared data pool, and/or various other parameters.

The master modem receives authorization to begin the internet session from the ISP system. See operation 110. The master modem sets a port and speed associated with the master modem to aid in maintaining Quality of Service (QoS) for the internet session. See operation 112. The master modem triggers the device for beginning the internet session. See operation 114.

The device utilizes data during the internet session, which is associated with the encrypted key. See operation 116. The master modem deducts the data used during the internet session from a shared data pool associated with the plurality of Internet Service Providers. The encrypted key is utilized to correlate the data used during the internet session with the deduction from the shared data pool. See operation 118.

The device may notify the master modem when data usage is complete. Further, the master modem may then notify the ISP system when data usage is complete.

The ISP system may utilize the encrypted key to correlate the data usage of the shared data pool with the device. Additionally, the ISP system may utilize the encrypted key to correlate the data usage with billing history and utilize the encrypted key for preparing transactional charges capable of being shared between a source service provider and a destination service provider.

The method 100 may be implemented by one or more systems including a dynamic telecom architecture enabling subscribers to seamlessly access data from different service providers (carriers) irrespective of geographies, end-devices and cellular technology generations. The system may also implement a billing technique for a shared data pool between different service providers, allowing the benefit of transactional charges to both the source service provider and the destination service provider. In one embodiment, the system may implement an intact differential business scope facilitating service providers to divide the data pool into a configurable ratio of x:y including the fixed and variable data pool. In this case, the variable data pool may be shared with other service providers while source service providers earn n % of every transaction data amount.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc. Moreover, in one embodiment, the system implementing the method 100 may include the master modem. Of course, in one embodiment, the system may include the master modem, the user device, and/or the ISP system, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
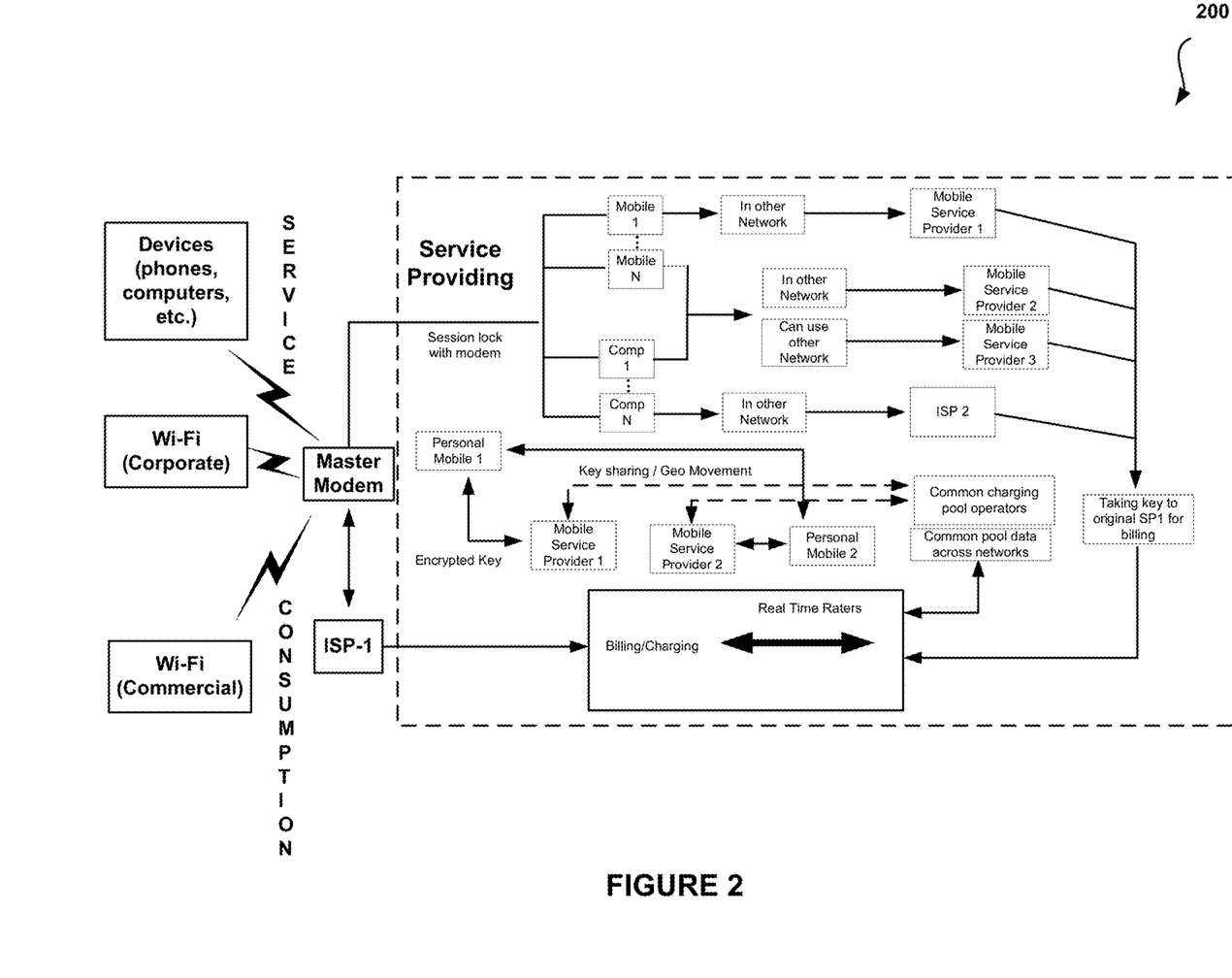
FIG. 2 shows a system flow diagram for providing seamless data access from different internet service providers, in accordance with one embodiment.

FIG. 2 shows a system flow diagram 200 for providing seamless data access from different internet service providers, in accordance with one embodiment. As an option, the flow diagram 200 may be implemented in the context of the details of the previous figure and/or any subsequent figure(s). Of course, however, the flow diagram 200 may be implemented in the context of any desired environment. Further, the aforementioned definitions may equally apply to the description below.

Currently, consumption of data among subscribers is increasing day by day, and data packets are even used for making voice based calls. In most cases, customers or end-users rely heavily on service providers for internet facilities. The problems in the conventional system can be explained with various example scenarios.

As a first example scenario, sometimes end-users starve for "need to have" access such as the "Right content at Right time at Right location" or the like. The service providers may be mobile service providers, or internet service providers, etc. However, the subscribers may not be able to access the data due to poor network coverage of their primary ISP at some locations, or at a particular time instant.

Another example scenario is providing a 100 GB of data with a validity period of one month to an end-user. It may happen the end-user consumes half of the total data in that month leaving the remaining unused. The remaining half of the data is wasted due to end of data usage validity period or lack of reusability scheme, etc. Such a scenario results in loss of network resources and benefits to both end-users as well as service providers.

As another example scenario, considering the expectations of the end-users and the exponentially increasing demand for data, flexibility and scope of data usage may be limited for the end-users. There may be multiple data packages available in a market to overcome the demand and supply of data to the end-users. However, the kinds of data packages available and the need of content to be accessed by the subscribers may not be matching for individual subscribers, as the demand of individual subscribers may be different.

As yet another example scenario, increased number of transactions and content usage may be pushing more businesses to cater to more end-users on existing network infrastructures, which may be expensive. Some of the non-limiting existing network infrastructures may include enhanced Frequency Division Multiplexing (FDM), Time Division Multiplexing (TDM), Orthogonal Frequency Division Multiplexing (OFDM), and/or Wavelength Division Multiplexing (WDM), etc.

In these examples, it can be understood that the need of content access and usage cannot be controlled as it is quite infeasible and difficult. However, flexibility of data packets can be implemented in such a way that the end-users can use data anytime and anywhere. Such an approach can provide content access regardless of service providers and their billing technique.

Hence, there is a need to maximize 'Ready to Use' internet distribution across end devices of different platforms (i.e. service providers) for seamless internet flow. Moreover, there is a need for using a shared pool data that can be distributed among different service providers, while sharing the transactional charge between a source and a destination service provider.

The system associated with the flow 200 implements a method for seamless data flow by sharing a data pool between different service providers and providing appropriate revenue sharing methods (i.e. billing) for such data sharing among service providers.

The methods for seamless data flow include sharing a data pool with different service providers, dividing the shared data pool into certain ratios, and billing for sharing transactional charges between the service providers. It should be understood that the ratio is configurable based on preferences of end-users, service providers, business partners and/or the like. The distribution of data into the given ratio helps in optimized usage of network resources.

The system allows for sharing data with other service providers different from the source service provider. The service providers can earn from every transaction of shared data. Moreover, the data pool shared among different service providers can be implemented in enhanced upcoming generational changes of networks such as scattered 3G, growing 4G or the like. The system can help by providing and catering a variety of combinational offerings to the end-users. Additionally, there may be a quantum of add-ons for the service providers as well as the end-users. Some of the add-ons may include rich plan offerings that enable service providers in saving network resources, especially wireline network connection. The more variable data options are available in the market, higher is the tendency of saving network resources.

The system associated with the flow diagram 200 utilizes methods based on an encrypted key that plays a crucial role for the seamless data flow between different service providers. The key may include information such as key owner, amount of content, validity, destination networks, and a content alteration that may be needed on destination networks, etc.

As shown in FIG. 2, different consumers of internet services are shown having a Wi-Fi connection facilitated by ISP-1. The consumers may be related to a corporate sector, commercial sector, or individual users, etc. In many embodiments, an end-user using services from one source service provider, such as Mobile Service Provider-1 (MSP-1) can share as well as use services from different service providers, say Mobile Service Provider-2 (MSP-2). The end-user may be using end devices such as smartphones, tablets, laptop, personal computers, and/or various other devices.

In one example scenario, the end-user may move from one geographical location to another that may affect services such as internet access from the mobile services. For instance, the service availed in a source location (a base or primary location of the end-user) may differ from the services availed in the destination that may restrict the end-user from certain data usage. In another example scenario, the services from the source service provider may also include validation that may cause wastage, inefficient usage of the service or the like.

The system associated with the flow diagram 200 implements methods that allow the end-user to share data and use services between different service providers through a key formation. The key formation can be implemented in a controlled manner based on service offerings from a host of source service provider. The key is an encrypted key that can be requested as per requirements of the user through an internet service provided by an ISP, such as the ISP-1.

The end-user device may access a Wi-Fi connection either from an office or a public area to generate the key. Initially, the end-user pings the modem of the corresponding Wi-Fi connection. The request is forwarded by the modem to a master modem of the ISP-1. The master modem provides a response by providing a virtual session lock between the end device and the modem that can be accessed using the key. The encrypted key is offloaded from the modem of the active Wi-Fi connection by the end-user. The end-user device then offloads the encrypted key from the end device. Once the session starts, data from the source service provider is deducted and then shared between different service providers by offloading the encrypted key. Accordingly, a common data pool may be shared across networks and a common charging pool may also be shared across service providers.

It should be noted that at this particular point, the end-user device does not use any network resources of the ISP-1. The end device then connects with other network and uses resources of the destination service provider (e.g., MSP-2) with the help of the key.

The destination service provider (MSP-2) decrypts the key and permits the end user device to use its resource based on their business handshake principle with the source service provider (ISP-1). Other examples shown in FIG. 2 include end devices, such as Mobile-1 or Mobile-N, using ISP-1 to access other wireline or wireless networks of different mobile service providers (e.g., MSP-2 or MSP-3). Also, end devices such as computer-1 (Comp 1) or computer-n (Comp N) using ISP-1 can distribute data or use a data card in other wirelines or wireless networks such as ISP-2.

In order to facilitate seamless data flow, the first-time handshake is required between different types of communication media such as wireless, wireline, or the like.

The key is provided to the source service provider for billing through a billing service unit. The billing service unit may consider parameters and information based on Event Data Records (EDRs), Credit Data Records (CDRs), Real-Time Raters, and the like. The billing of the data usage provides a transactional charge that is divisible into a configurable ratio and shared between the source and destination service provider.

Moreover, in one embodiment, the system implementing the techniques described herein may provide a GUI based application to end-users through which the end-users can access data sharing services. In this case, the GUI may allow an end-user associated with an end device to initiate the process for data sharing over different service providers. The end device may include electronic devices such as smartphones, mobile phones, tablets, laptops, personal computers, and/or the like. The GUI may be a mobile-based or a web-based application capable of offloading internet and sharing a common pool of data. Moreover, the GUI can be integrated with an existing Unstructured Supplementary Service Data (USSD) system for end-users with a subscription of pre-paid services. The integration of a GUI application with the USSD system may provide information such as prepaid balance transfer information, or customization of possible service offerings, etc.

Thus, the technology/system described herein provides a seamless flow of data between different service provider platforms. Increasing the number of data transactions can help easing the voice and data access with the benefit of charging per transaction. The number of transactions can be increased based on scalability mode. Moreover, the key can allow offloading from a network such as 2G-3G over 4G network resource and vice-versa. The key expiry concept at modem and ISP level can facilitate a synchronized data management, especially for corporate sectors. The demand from non-affordable segments of society can also be increased.

Figure 3:
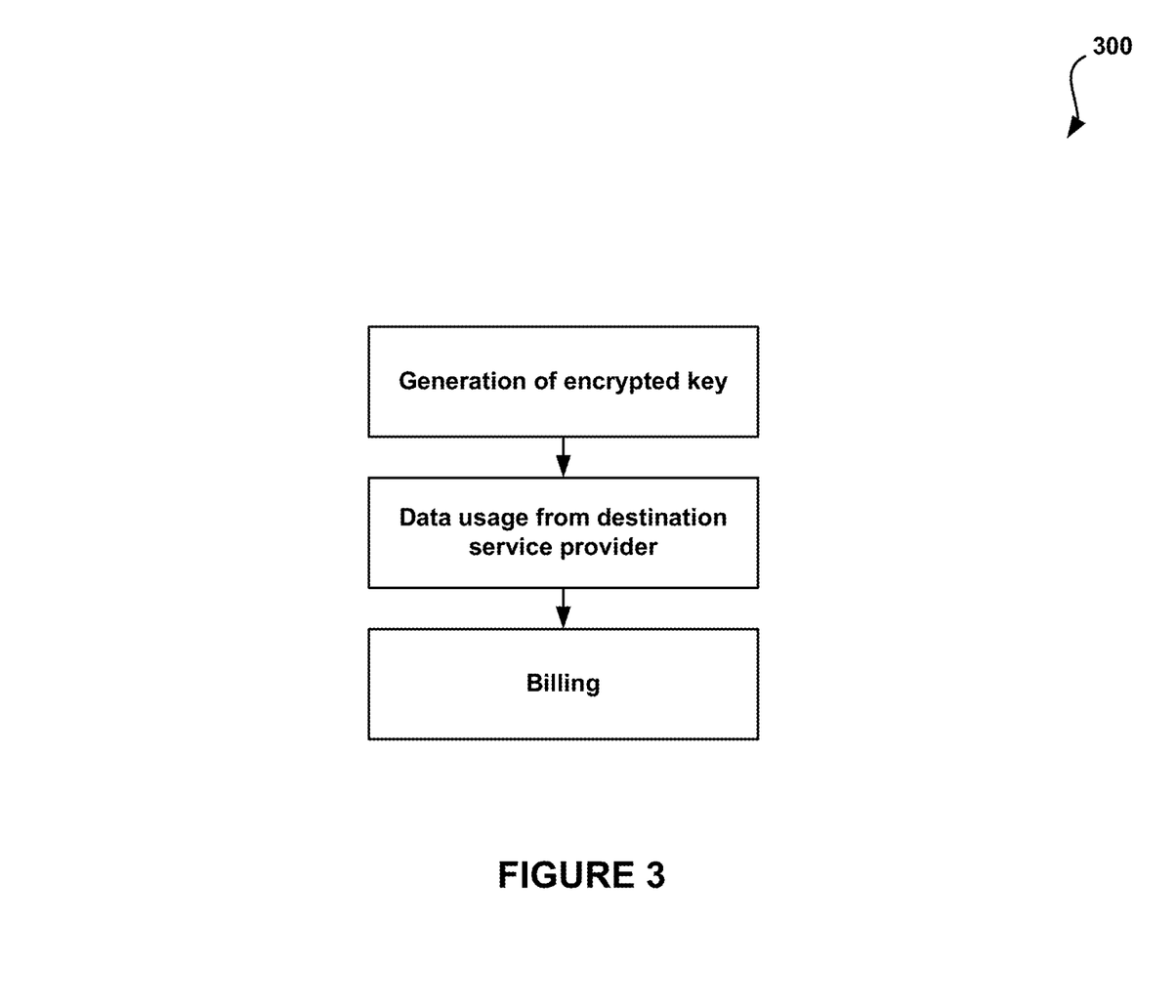
FIG. 3 shows a procedure for providing seamless data flow, in accordance with one embodiment.

FIG. 3 shows a procedure 300 for providing seamless data flow, in accordance with one embodiment. As an option, the procedure 300 may be implemented in the context of the details of the previous figures and/or any subsequent figure(s). Of course, however, the procedure 300 may be implemented in the context of any desired environment. Further, the aforementioned definitions may equally apply to the description below.

As shown in FIG. 3, in one embodiment, the basic procedure for seamless data flow between different service providers may be broadly divided into generation of an encrypted key, data usage from a destination service provider, and billing.

In operation, a system may generate an encrypted key for allowing an end-user originally using services from a source service provider to use data in a different destination service provider. Based on the key obtained, consumption of data by the end-user is allowed in the destination service provider. The key may provide information for data usage amount, key owner, and the like. The same key may be used for entering information in billing history as well as for preparing transactional charges. The transactional charges may be shared between the source and the destination service provider. These steps may also be explained with the help of the flow diagram shown in FIG. 4.

Figure 4:
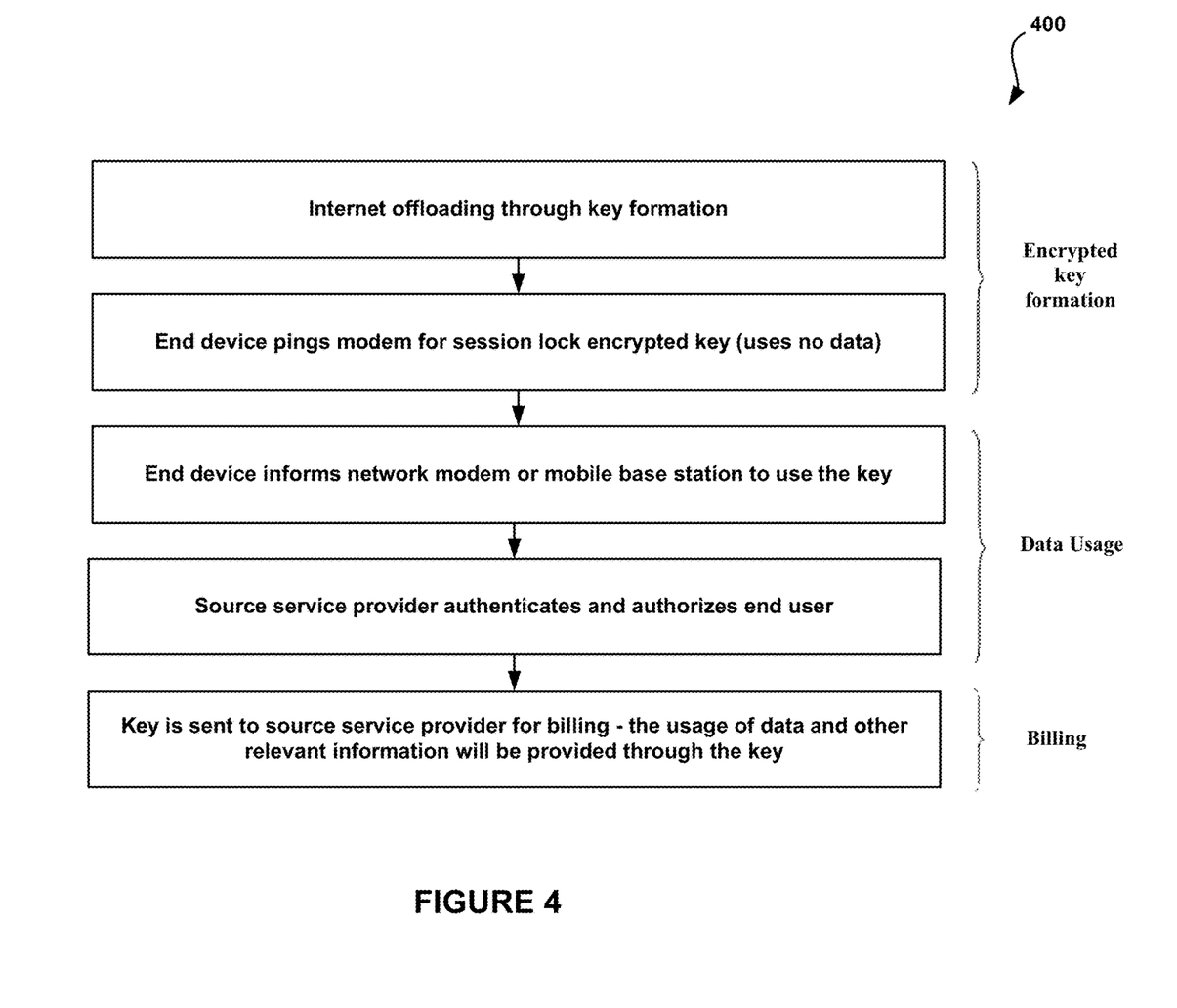
FIG. 4 shows a system flow diagram for providing seamless data flow between different service providers, in accordance with one embodiment.

FIG. 4 shows a system flow diagram 400 for providing seamless data flow between different service providers, in accordance with one embodiment. As an option, the system flow diagram 400 may be implemented in the context of the details of the previous figures and/or any subsequent figure(s). Of course, however, the system flow diagram 400 may be implemented in the context of any desired environment. Further, the aforementioned definitions may equally apply to the description below.

As a first step, there is a key request by an end device via a modem associated with a public or private internet connection. Initially, the internet has to be offloaded using an encrypted key formation through a session lock between the end device and an ISP.

In one embodiment, an end-user device may request for a key for accessing another network through the modem of an ISP. In this case, the end-user device pings the corresponding modem to obtain an encrypted key. The end-device then captures the key from the modem and uses the key as per the agreement between ISP and the end-user. The internet is then offloaded using the key that deducts from a data pool of source service provider.

After obtaining the key, the end device pings a network modem or a mobile network base station of the destination service provider to use the key.

In one embodiment, the modem and ISP may be configured together for making a key rather than consuming actual data. Moreover, the agreement between the ISP and user may be configurable at each service level.

The end device then informs (e.g. pings) the network modem or mobile base station of destination service provider to use the encrypted key. Firstly, the destination service provider decrypts the encrypted key. The destination service provider then authenticates and authorizes the end-user based on various mechanisms that may be provided by the ISP or may be obtained by a real-time check from the ISP. Once the end-user is authenticated and authorized, the end-user can use data content based on parameters defined in the key.

In one embodiment, the data pool may be divisible into a ratio of fixed and variable data, where the fixed data belongs to the source service provider and the variable data can be shared with other service providers.

In one embodiment, the ratio may be represented as: $D \rightarrow X:Y$, where D is the total data, X is fixed data to be used in the source service provider, and Y is variable data to be used in the destination service provider.

The modem may send the key along with other relevant information for billing services to the source service provider for billing the usage of data. The transactional charge may be shared between the source and destination service provider.

In one embodiment, the charges for the existing data pool may be divided into a ratio such that a charge on Y variable data is increased while reducing the total consumption with the Y factor. The distribution of data into the ratio helps in decreasing network resources as the total consumption with Y factor is reduced.

The charge on Y variable data may be increased by n % of its original cost, which allows the end-users to enjoy independent content access regardless of data source origin. The n % charge provides a data transactional charge that can be shared between a source service provider and a destination service provider of transfer.

In one embodiment, the ratio for billing may be represented as: $C \rightarrow x:y$, where C is the total cost or charge for data pool D, x is the charge for fixed data X, and y is the charge for variable data Y.

As per the proposed billing technique, the variable data is charged n % of the total data. Then, y=n % of x. Therefore, the total charge of D, C is x+n % of x. The n % charge earned is shared between the source service provider and destination service provider. Thus, the variable data can be transacted anywhere, while service providers earn n % of every transaction data amount.

Figure 5:
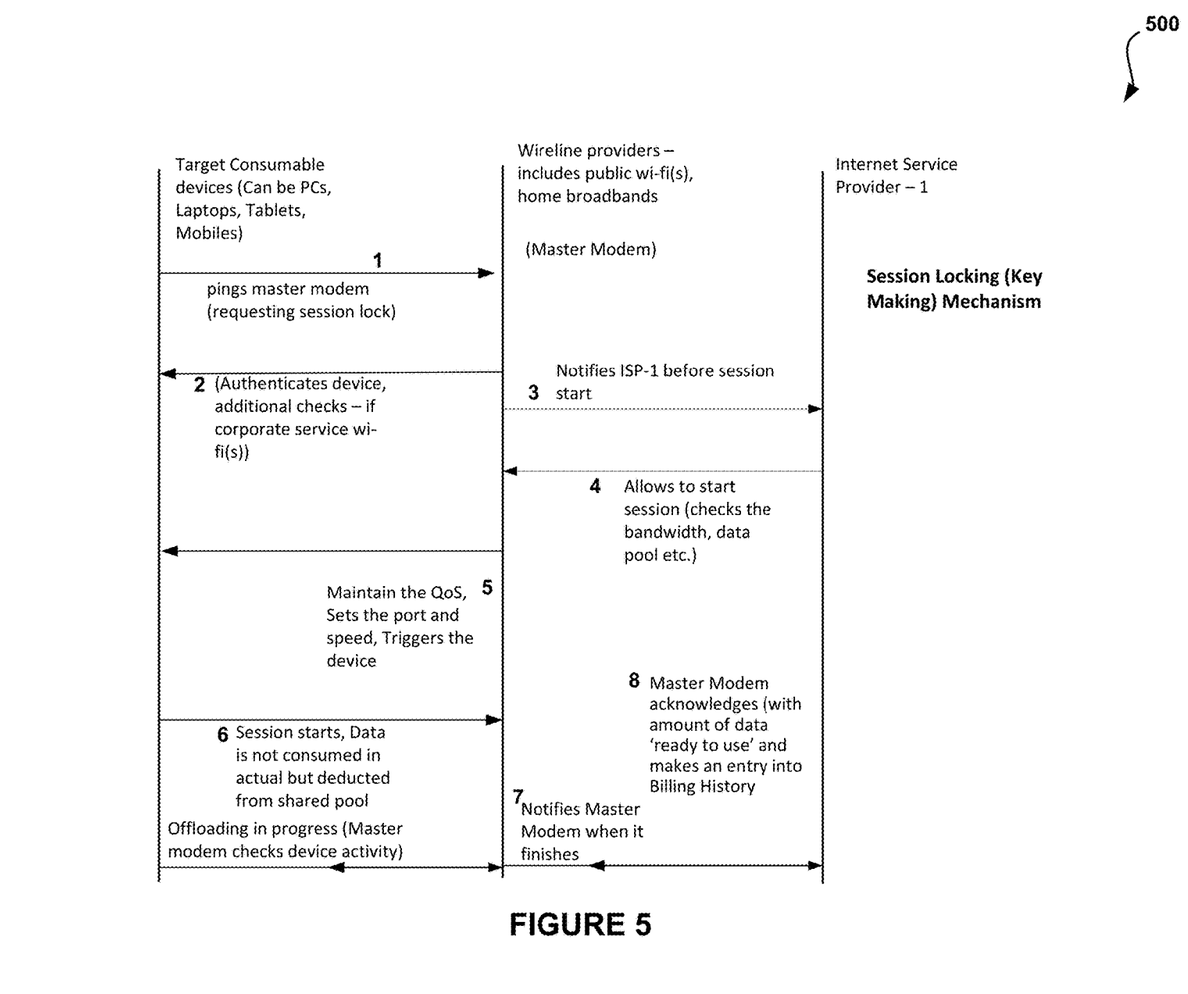
FIG. 5 shows a system flow diagram for a communication process between an end device and an ISP system to obtain an encrypted key through a master modem, in accordance with one embodiment.

FIG. 5 shows a system flow diagram 500 for a communication process between an end device and an ISP system to obtain an encrypted key through a master modem, in accordance with one embodiment. As an option, the system flow diagram 500 may be implemented in the context of the details of the previous figures and/or any subsequent figure(s). Of course, however, the system flow diagram 500 may be implemented in the context of any desired environment. Further, the aforementioned definitions may equally apply to the description below.

In operation, a user device pings a master modem, requesting for a session lock. See step 1. The master modem then authenticates the end device before allowing the session lock. See step 2. Additional checking may be performed for internet services belonging to a corporate sector.

The modem notifies an Internet Service Provider (e.g., ISP-1) before beginning the session with the end device. See step 3. The ISP receives the message and starts checking parameters such as bandwidth, data pool, and the like to allow the session to begin. See step 4.

The modem then helps in maintaining Quality of Service (QoS), sets the port and speed and then triggers the end device for the session. See step 5. The session is initiated and data from the source service provider of the end-user is deducted from shared data pool. See step 6.

The modem checks on the activity of the end device when the data is offloaded and at the completion of the data offload the end device notifies the modem. See step 7. The modem then acknowledges the activity of the end device and sends the key along with information such as the amount of data ready to use, or the like, to make an entry in billing history. See step 8.

Figure 6:
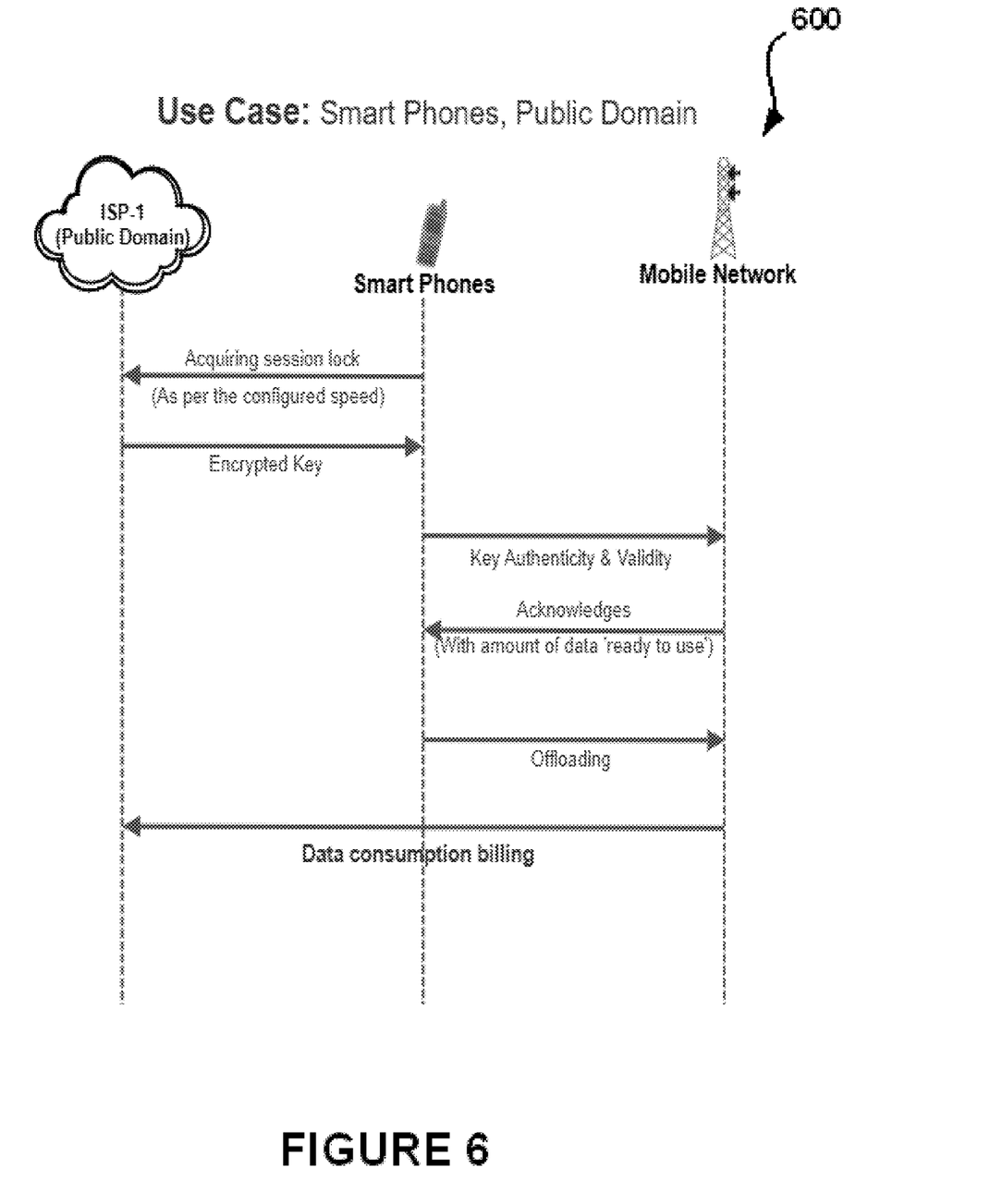
FIG. 6 shows an example of a use case including a mobile to an ISP and vice-versa, in accordance with one embodiment.

FIG. 6 shows an example 600 of a use case including a mobile to an ISP and vice-versa, in accordance with one embodiment. As an option, the example 600 may be implemented in the context of the details of the previous figures and/or any subsequent figure(s). Of course, however, the example 600 may be implemented in the context of any desired environment. Further, the aforementioned definitions may equally apply to the description below.

Consider an end-user associated with a smartphone having Wi-Fi connectivity from a public domain that can access different mobile networks. The smartphone can make a hit to the corresponding ISP, say ISP-1 to acquire a session lock. The ISP-1 provides an encrypted key to the smartphone. Using the key, authentication and validity information of the end-user is sent to a destination mobile network. The mobile network acknowledges the request and provides 'ready to use' data to the end-user. The data is offloaded and informed to the destination mobile network by the smartphone. The data consumption information is then sent to the ISP-1 for billing the transactional data charges.

Figure 7:
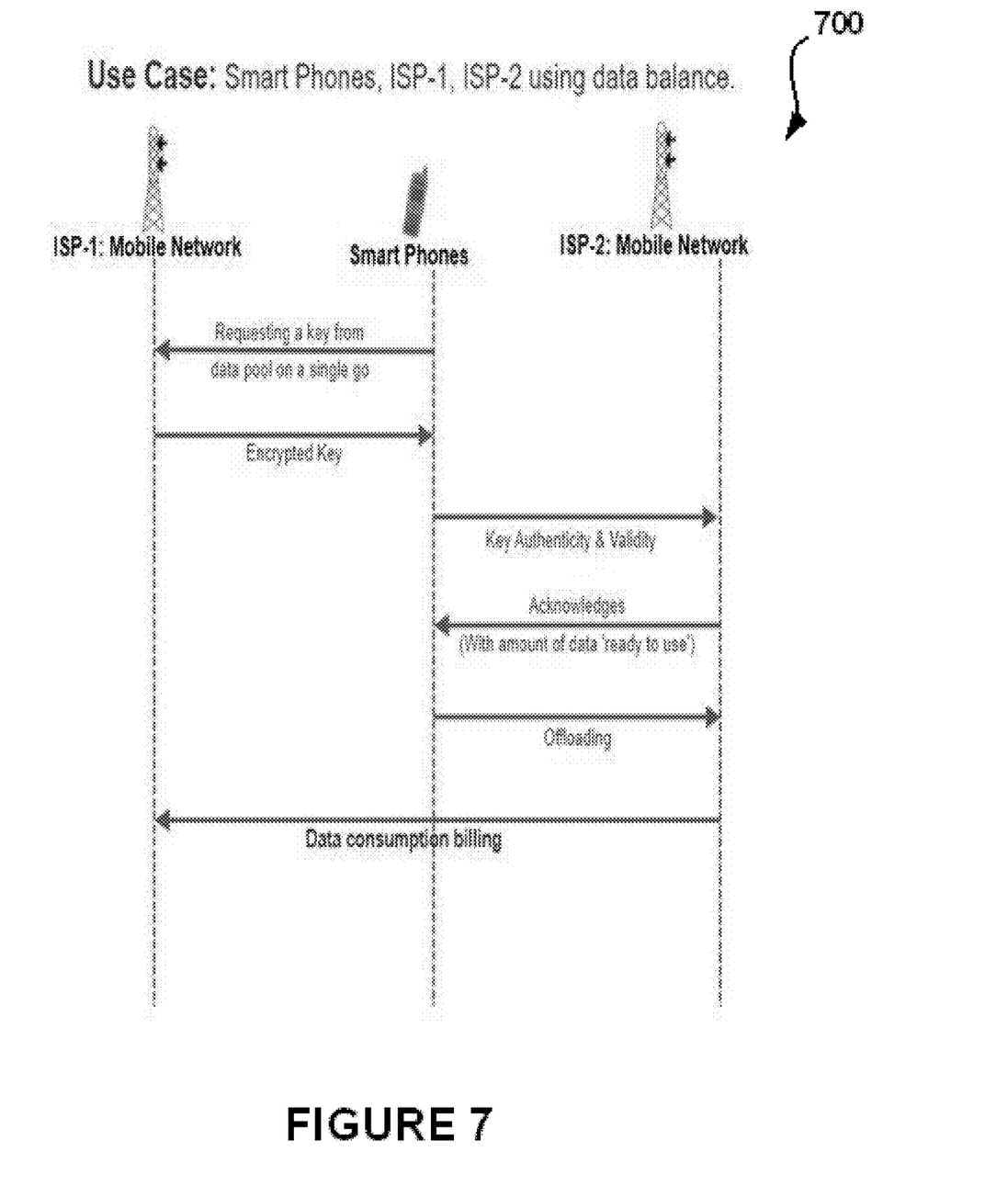
FIG. 7 shows an example of a use case including mobile to mobile data use, in accordance with one embodiment.

FIG. 7 shows an example 700 of a use case including mobile to mobile data use, in accordance with one embodiment. As an option, the example 700 may be implemented in the context of the details of the previous figures and/or any subsequent figure(s). Of course, however, the example 700 may be implemented in the context of any desired environment. Further, the aforementioned definitions may equally apply to the description below.

In the example shown in FIG. 7, an end-user may access ISPs from different mobile networks. In operation, the smartphone requests for a key for a data pool from ISP-1 of a mobile network. The ISP-1 provides the encrypted key to the smartphone and uses it for authenticity and validity in a different ISP such as ISP-2. Then, ISP-2 acknowledges the request to access as well as understands a 'ready to use' amount of data. The offloading is initiated and the key is offloaded in the ISP-2. After the internet offload, the key is sent to the ISP-1 that can be used billing data consumption.

Figure 8:
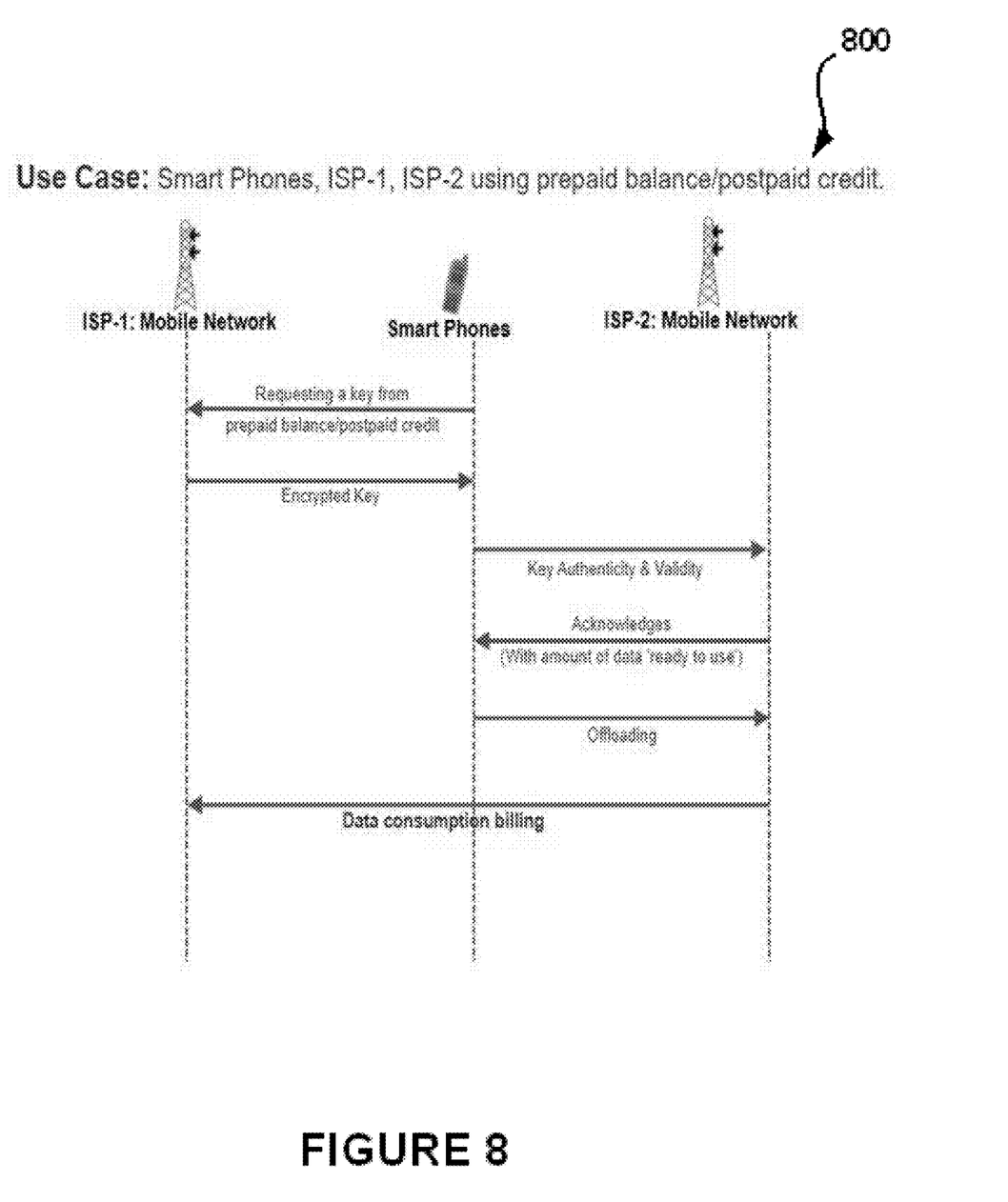
FIG. 8 shows an example of a use case including mobile to mobile data use based on a prepaid/postpaid subscription, in accordance with one embodiment.

FIG. 8 shows an example 800 of a use case including mobile to mobile data use based on a prepaid/postpaid subscription, in accordance with one embodiment. As an option, the example 800 may be implemented in the context of the details of the previous figures and/or any subsequent figure(s). Of course, however, the example 800 may be implemented in the context of any desired environment. Further, the aforementioned definitions may equally apply to the description below.

For an end-user that may subscribe to a pre-paid or a post-paid service, the smartphone can request the key from the ISP-1 through pre-paid balance or post-paid credit. The ISP-1 provides an encrypted key to the smartphone. Using the key, authentication and validity information of the end-user is sent to a destination mobile network. The mobile network acknowledges the request and provides 'ready to use' data to the end-user. The data is offloaded and informed to the destination mobile network by the smartphone. The data consumption information is then sent to the ISP-1 for billing the transactional data charges.

In another example scenario, an end-user can watch a video of 20 MB that buffers in 10 minutes. Subsequently, a request for storing a video of 20 MB may be initiated through a lock for a particular session of 10 minutes. The actual data is not being stored from the ISP or the source network for these 10 minutes. However, the desired content may be used from a different mobile network. The ISP provides the authentication and authorization of the end-user to access the other network. An encrypted key is provided, which is decrypted by the destination network. Using the key, the key owner is authorized to use 20 MB data and with the help of the key, the data usage amount can be checked.

Moreover, for domestic usage, the key can be offloaded as a data burst promptly. For example, when the end-user is at home, the end-user can get a quick key of 1 GB and consume the data. The request for data or content is configurable from a host of the service provider.

Figure 9:
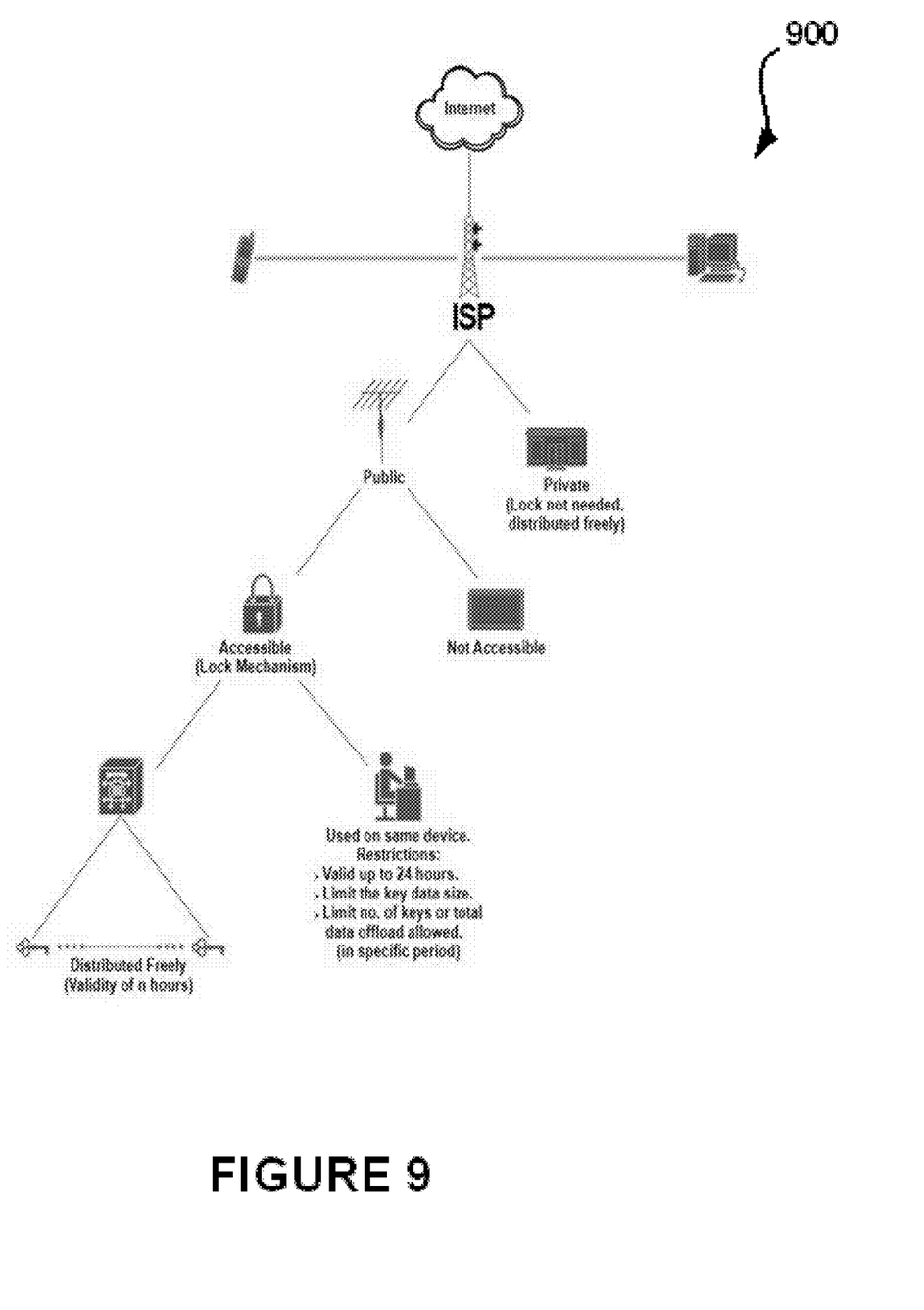
FIG. 9 shows a system diagram showing accessibility control for implementing seamless data flow between different mobile networks, in accordance with one embodiment.

FIG. 9 shows a system diagram 900 showing accessibility control for implementing seamless data flow between different mobile networks, in accordance with one embodiment. As an option, the diagram 900 may be implemented in the context of the details of the previous figures and/or any subsequent figure(s). Of course, however, the diagram 900 may be implemented in the context of any desired environment. Further, the aforementioned definitions may equally apply to the description below.

The accessibility of seamless data flow can be controlled corresponding to public or private availability of services. Data accessibility at a private level may not require a session lock mechanism and data may be distributed without any restrictions. However, data accessibility at public level strongly requires the lock mechanism.

A session lock is kept so as to make sure that no end-user requests a huge data such as 1 GB data from free public Wi-Fi in 2 minutes and walks away. Based on the speed of the public Wi-Fi, the end-user has to remain in the Wi-Fi zone and virtually download the content.

The data can then be used by different end devices or by same end device with the help of a key. The key may hold information such as validity for using the data by different end devices. For using the same end device, the key may include validity up to 24 hours with limited data size, a limited number of keys, limited data offload, and the like.

Additional add-ons that add values or provide benefits can also be provided through the implementation of the system described herein. An Interactive Voice Response (IVR) service can also be deployed. For example, services that may be provided may include: balance transfer between post-paid and pre-paid subscribers; sharing between global pre-paid to pre-paid of different service providers; and data share between post-paid to post-paid and pre-paid to post-paid, etc.

Figure 10:
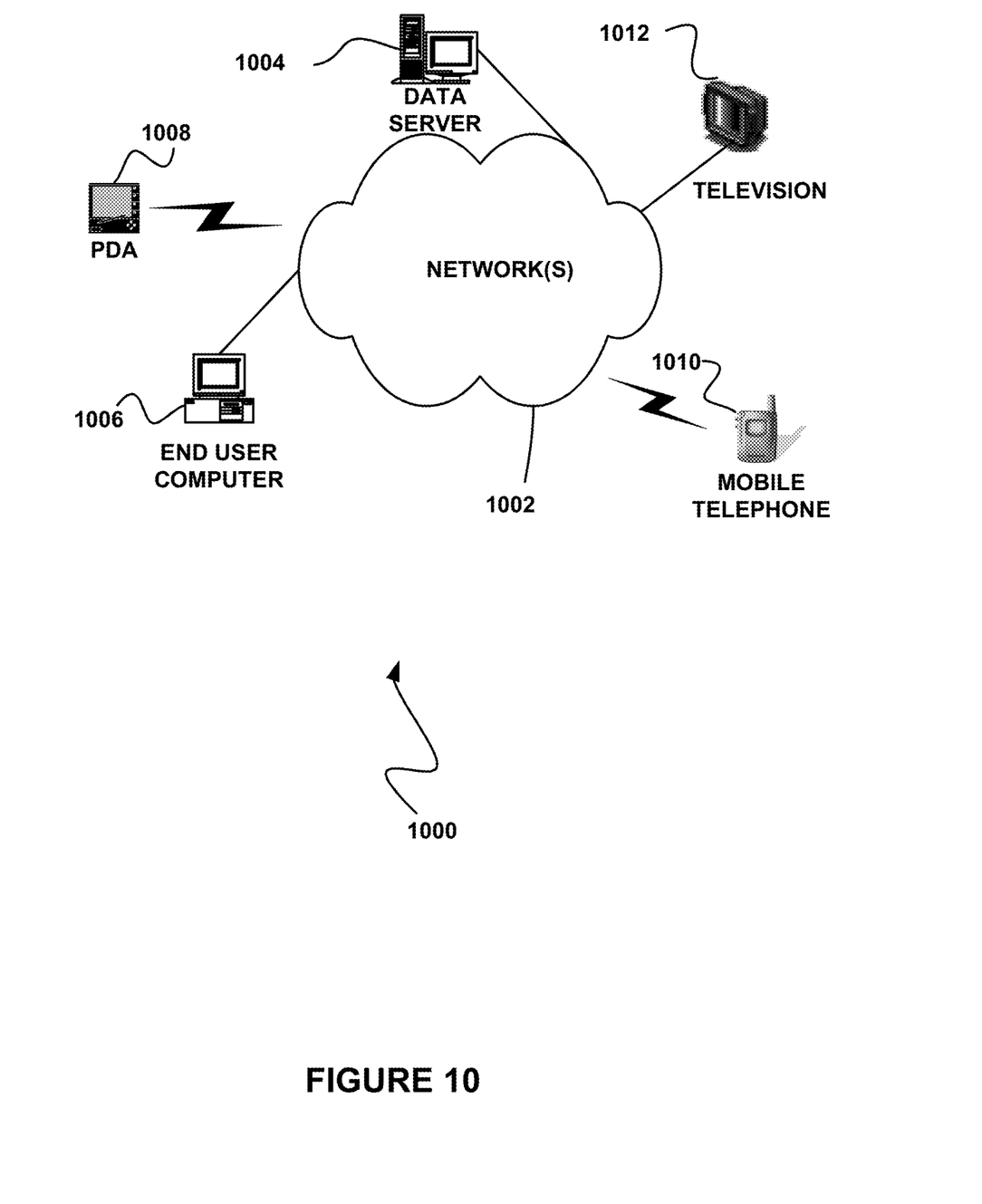
FIG. 10 illustrates a network architecture, in accordance with one possible embodiment.

FIG. 10 illustrates a network architecture 1000, in accordance with one possible embodiment. As shown, at least one network 1002 is provided. In the context of the present network architecture 1000, the network 1002 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1002 may be provided.

Coupled to the network 1002 is a plurality of devices. For example, a server computer 1004 and an end user computer 1006 may be coupled to the network 1002 for communication purposes. Such end user computer 1006 may include a desktop computer, lap-top computer, and/or any other type of logic. Still yet, various other devices may be coupled to the network 1002 including a personal digital assistant (PDA) device 1008, a mobile phone device 1010, a television 1012, etc.

Figure 11:
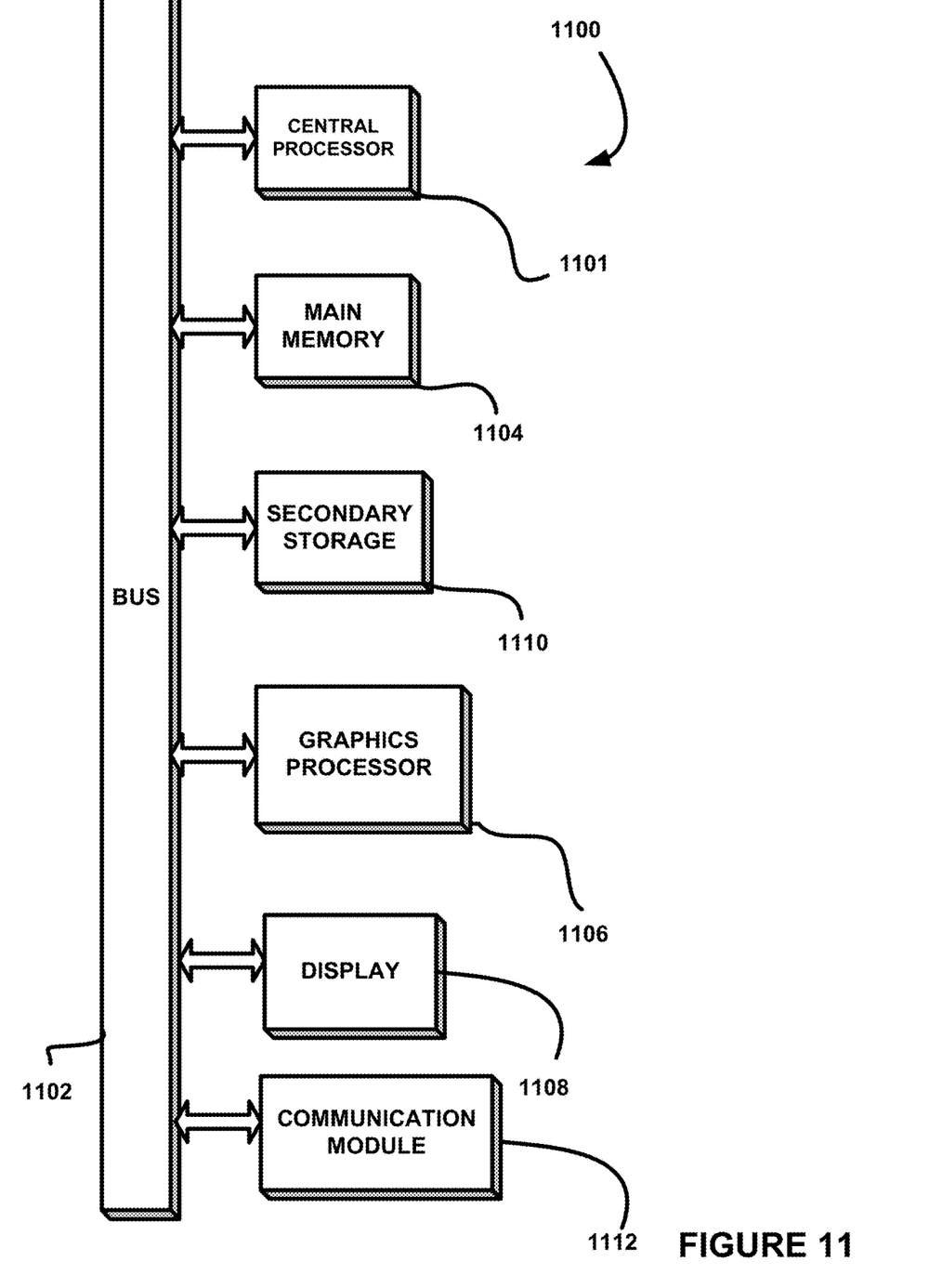
FIG. 11 illustrates an exemplary system, in accordance with one embodiment.

FIG. 11 illustrates an exemplary system 1100, in accordance with one embodiment. As an option, the system 1100 may be implemented in the context of any of the devices of the network architecture 1000 of FIG. 10. Of course, the system 1100 may be implemented in any desired environment.

As shown, a system 1100 is provided including at least one central processor 1101 which is connected to a communication bus 1102. The system 1100 also includes main memory 1104 [e.g. random access memory (RAM), etc.]. The system 1100 also includes a graphics processor 1106 and a display 1108.

The system 1100 may also include a secondary storage 1110. The secondary storage 1110 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1104, the secondary storage 1110, and/or any other memory, for that matter. Such computer programs, when executed, enable the system 1100 to perform various functions (as set forth above, for example). Memory 1104, storage 1110 and/or any other storage are possible examples of non-transitory computer-readable media.

The system 1100 may also include one or more communication modules 1112. The communication module 1112 may be operable to facilitate communication between the system 1100 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a master modem, a ping from a device for requesting an encrypted key associated with an internet session corresponding to one of a plurality of Internet Service Providers (ISPs);
   authenticating, by the master modem, the device and responding with the encrypted key;
   notifying, by the master modem, an Internet Service Provider (ISP) system associated with the internet session with the encrypted key before beginning the internet session with the device;

verifying, by the ISP system, parameters to determine whether to allow the internet session to begin, in response to the notifying;

receiving, by the master modem, authorization to begin the internet session from the ISP system;

setting, by the master modem, a port and speed associated with the master modem to aid in maintaining Quality of Service (QoS) for the internet session;

triggering, by the master modem, the device for beginning the internet session;

utilizing, by the device, data during the internet session, which is associated with the encrypted key; and deducting, by the master modem, the data used during the internet session from a shared data pool associated with the plurality of Internet Service Providers, wherein the encrypted key is utilized to correlate the data used during the internet session with the deduction from the shared data pool.

2. The method of claim 1, wherein the parameters include bandwidth.

3. The method of claim 1, wherein the parameters include data available in the shared data pool.

4. The method of claim 1, wherein the device notifies the master modem when data usage is complete.

5. The method of claim 4, wherein the master modem notifies the ISP system when data usage is complete.

6. The method of claim 5, wherein the ISP system utilizes the encrypted key to correlate the data usage of the shared data pool with the device.

7. The method of claim 5, wherein the ISP system utilizes the encrypted key to correlate the data usage with billing history and utilizes the encrypted key for preparing transactional charges capable of being shared between a source service provider and a destination service provider.

8. A computer program product embodied on a non-transitory computer readable medium, comprising computer code for:

receiving, by a master modem, a ping from a device for requesting an encrypted key associated with an internet session corresponding to one of a plurality of Internet Service Providers (ISPs);

authenticating, by the master modem, the device and responding with the encrypted key;

notifying, by the master modem, an Internet Service Provider (ISP) system associated with the internet session with the encrypted key before beginning the internet session with the device;

verifying, by the ISP system, parameters to determine whether to allow the internet session to begin, in response to the notifying;

receiving, by the master modem, authorization to begin the internet session from the ISP system;

setting, by the master modem, a port and speed associated with the master modem to aid in maintaining Quality of Service (QoS) for the internet session;

triggering, by the master modem, the device for beginning the internet session;

utilizing, by the device, data during the internet session, which is associated with the encrypted key; and deducting, by the master modem, the data used during the internet session from a shared data pool associated with the plurality of Internet Service Providers, wherein the encrypted key is utilized to correlate the data used during the internet session with the deduction from the shared data pool.

9. The computer program product of claim 8, wherein the parameters include bandwidth.

10. The computer program product of claim 8, wherein the parameters include data available in the shared data pool.

11. The computer program product of claim 8, wherein the device notifies the master modem when data usage is complete.

12. The computer program product of claim 11, wherein the master modem notifies the ISP system when data usage is complete.

13. The computer program product of claim 12, wherein the ISP system utilizes the encrypted key to correlate the data usage of the shared data pool with the device.

14. The computer program product of claim 12, wherein the ISP system utilizes the encrypted key to correlate the data usage with billing history and utilizes the encrypted key for preparing transactional charges capable of being shared between a source service provider and a destination service provider.

15. A system including a master modem, operable for:

receiving, by the master modem, a ping from a device for requesting an encrypted key associated with an internet session corresponding to one of a plurality of Internet Service Providers (ISPs);

authenticating, by the master modem, the device and responding with the encrypted key;

notifying, by the master modem, an Internet Service Provider (ISP) system associated with the internet session with the encrypted key before beginning the internet session with the device;

verifying, by the ISP system, parameters to determine whether to allow the internet session to begin, in response to the notifying;

receiving, by the master modem, authorization to begin the internet session from the ISP system;

setting, by the master modem, a port and speed associated with the master modem to aid in maintaining Quality of Service (QoS) for the internet session;

triggering, by the master modem, the device for beginning the internet session;

utilizing, by the device, data during the internet session, which is associated with the encrypted key; and deducting, by the master modem, the data used during the internet session from a shared data pool associated with the plurality of Internet Service Providers, wherein the encrypted key is utilized to correlate the data used during the internet session with the deduction from the shared data pool.

16. The system of claim 15, wherein the parameters include bandwidth.

17. The system of claim 15, wherein the parameters include data available in the shared data pool.

18. The system of claim 15, wherein the device notifies the master modem when data usage is complete.

19. The system of claim 18, wherein the master modem notifies the ISP system when data usage is complete.

20. The system of claim 19, wherein the ISP system utilizes the encrypted key to correlate the data usage with billing history and utilizes the encrypted key for preparing transactional charges capable of being shared between a source service provider and a destination service provider.

* * * * *